(12) United States Patent
Swensen et al.

(10) Patent No.: US 9,896,388 B2
(45) Date of Patent: Feb. 20, 2018

(54) COAL-DERIVED MINERAL MATTER AS A SOIL AMENDMENT

(71) Applicant: Earth Technologies USA Limited, Santa Barbara, CA (US)

(72) Inventors: James S. Swensen, Santa Barbara, CA (US); Simon K. Hodson, Santa Barbara, CA (US)

(73) Assignee: EARTH TECHNOLOGIES USA LIMITED, Santa Barbara, CA (US)

( * ) Notice: Subject to any disclaimer, the term of this patent is extended or adjusted under 35 U.S.C. 154(b) by 172 days.

(21) Appl. No.: 14/694,735

(22) Filed: Apr. 23, 2015

(65) Prior Publication Data

US 2016/0311728 A1  Oct. 27, 2016

(51) Int. Cl.
| | |
|---|---|
| C05F 11/02 | (2006.01) |
| C05D 9/02 | (2006.01) |
| C05D 5/00 | (2006.01) |
| C05B 17/00 | (2006.01) |
| C05C 11/00 | (2006.01) |
| C05D 1/04 | (2006.01) |
| C05D 3/00 | (2006.01) |
| C05G 3/04 | (2006.01) |

(52) U.S. Cl.
CPC ............... *C05D 9/02* (2013.01); *C05B 17/00* (2013.01); *C05C 11/00* (2013.01); *C05D 1/04* (2013.01); *C05D 3/00* (2013.01); *C05D 5/00* (2013.01); *C05G 3/04* (2013.01); *C05F 11/02* (2013.01)

(58) Field of Classification Search
None
See application file for complete search history.

(56) References Cited

U.S. PATENT DOCUMENTS

| | | | | |
|---|---|---|---|---|
| 4,469,503 A | * | 9/1984 | Stockel | C05C 11/00 71/24 |
| 4,541,857 A | * | 9/1985 | Snively | C05D 9/00 71/24 |
| 4,788,360 A | * | 11/1988 | Calemma | C08H 99/00 44/608 |

(Continued)

FOREIGN PATENT DOCUMENTS

| | | | | |
|---|---|---|---|---|
| CA | 1152349 A | | 8/1983 | |
| CN | 102173947 | * | 9/2011 | ............... C05G 3/00 |

(Continued)

*Primary Examiner* — Wayne Langel
(74) *Attorney, Agent, or Firm* — Kirton McConkie; Evan R. Witt

(57) ABSTRACT

Coal-derived mineral matter particles are an effective soil amendment. Coal-derived mineral matter particles added to soil increase the silt and clay fractions of the soil and improve the soil texture. The fine coal-derived mineral matter particles also increase mineral and essential nutrient availability for plant growth. Improved soil texture also increases water holding capacity and cation-exchange capacity (CEC) of the soil. The mineral matter particles typically have a size less than 50 μm and an average size of 10 μm or less. In some non-limiting embodiments, the mineral matter particles mixed with the soil are present in the mixture in an amount ranging from 5 to 30 wt. %. The coal-derived mineral matter particles contain a plurality of essential nutrients necessary for healthy plant growth selected from B, Ca, Cl, Cu, Fe, Mg, Mn, Mo, N, P, K, S, and Zn.

14 Claims, 4 Drawing Sheets

(56) References Cited

U.S. PATENT DOCUMENTS

| | | | |
|---|---|---|---|
| 5,451,240 A | 9/1995 | Trowbridge | |
| 5,603,744 A | 2/1997 | Kurner | |
| 6,775,948 B2 * | 8/2004 | Johnston | A01G 9/1086 47/58.1 SC |
| 7,291,199 B2 * | 11/2007 | Rao | B01D 53/565 504/113 |
| 7,874,101 B2 * | 1/2011 | Krysiak | A01C 1/046 47/58.1 SC |
| 9,656,922 B2 * | 5/2017 | Miranda | C05D 9/00 |
| 9,656,923 B2 * | 5/2017 | Miranda | C05B 5/00 |
| 2003/0070460 A1 * | 4/2003 | Logan | A61L 11/00 71/11 |
| 2003/0089151 A1 * | 5/2003 | Logan | A61L 11/00 71/11 |
| 2003/0136165 A1 * | 7/2003 | Logan | A61L 11/00 71/11 |
| 2004/0188340 A1 * | 9/2004 | Appel | B01D 3/009 210/321.68 |
| 2004/0192980 A1 * | 9/2004 | Appel | B01D 3/009 585/240 |
| 2008/0242543 A1 | 10/2008 | Banerjee et al. | |
| 2013/0227998 A1 * | 9/2013 | Copplestone | C05B 17/00 71/24 |
| 2014/0349847 A1 * | 11/2014 | Schrader | C05F 11/02 504/100 |
| 2014/0360238 A1 | 12/2014 | Ward | |
| 2016/0096779 A1 * | 4/2016 | Handley | C05G 3/0005 71/19 |

FOREIGN PATENT DOCUMENTS

| | | | | |
|---|---|---|---|---|
| DE | 29618816 | * | 3/1997 | C05F 11/00 |
| JP | 2011190158 | * | 9/2011 | C05F 11/02 |
| RU | 2246470 | * | 2/2005 | C05F 11/02 |

* cited by examiner

COAL-DERIVED MINERAL MATTER AS A SOIL AMENDMENT

FIELD OF THE INVENTION

This disclosure relates to the use of coal-derived mineral matter used as a soil amendment. More specifically, fine mineral matter recovered from coal having an average size less than 10 μm is mixed with soil to provide soil texture and mineral nutrient benefits.

BACKGROUND AND DESCRIPTION

Soil

Soil contains small particles of decomposed rocks and minerals in the form of sand, silt, and clay. Soil consists of many layers called horizons. The top horizon is generally called top soil. Top soil is a mixture of mineral matter, decayed plant and animal organic matter, and micro and macroorganisms, such as bacteria, fungi, nematodes and worms. The literature estimates that it takes between 500 and 1000 years for nature to make one inch of topsoil. On the other side, through agricultural, mining and deforestation practices topsoil is being lost and degraded rapidly around the world. The U.S. Department of Agriculture (USDA) estimates that the United States alone loses almost three tons of topsoil per acre per year ("Summary Report, 2007 Natural Resources Inventory", Natural Resources Conservation Services, U.S. Department of Agriculture. December 2009. p. 97). Small particles are more easily lost to erosion than larger particles.

Soil Texture

Particle size is classified by the USDA into three main groupings: sand, silt and clay (other countries have other systems, though they are comparable). Clay particle sizes are defined as less than 2 μm. Particles between 2 μm and 50 μm are classified as silt. Particles from 50 μm to 2 mm are considered sand. Note that the clay, silt, and sand size classifications do not denote the chemical nature of the particle, just the size classification. Ideal particle balanced soil texture is classified as loam. Loam consists generally of about 40% sand, 40% silt, and 20% clay particles. Very few agricultural fields have the ideal soil texture of loam. In many cases silt and clay have been lost due to erosion. There is a need in the art to provide a method for improving soil texture or the balance of sand, silt and clay.

Mineral and Nutrient Content

Nutrients are essential for healthy plant growth. Most plant nutrients originate from fine silt and clay soil particles. Yet many soils have lost the fine-sized silt and clay and their associated nutrients. There is a need in the art to provide a method for improving agricultural soil nutrient characteristics to promote healthy plant growth and ultimately good human nutrition.

SUMMARY OF THE INVENTION

The disclosed invention provides a method of improving soil texture and nutrient concentration profile. The method includes obtaining a quantity of coal-derived mineral matter particles and mixing the mineral matter particles with soil. Coal-derived mineral matter when added to soil increases the silt and clay fractions of the soil changing the soil texture. The fine mineral matter also increases mineral and essential nutrient availability for plant growth. Improved soil texture can also increase water holding capacity and cation-exchange capacity (CEC) of the soil. The coal-derived mineral matter particles are an effective soil amendment.

In some disclosed embodiments, the coal-derived mineral matter particles have a size less than 50 μm. In other disclosed embodiments, the coal-derived mineral matter particles have a size less than 30 μm. In some non-limiting embodiments, the coal-derived mineral matter particles have an average size of 10 μm or less. In some non-limiting embodiments, the mineral matter particles mixed with the soil are present in the mixture in an amount ranging from 5 to 30 wt. %. In other embodiments, the mineral matter particles mixed with the soil are present in the mixture in an amount ranging from 10 to 20 wt. %.

The coal-derived mineral matter particles contain a plurality of essential nutrients necessary for healthy plant growth selected from B, Ca, Cl, Cu, Fe, Mg, Mn, Mo, N, P, K, S, and Zn.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
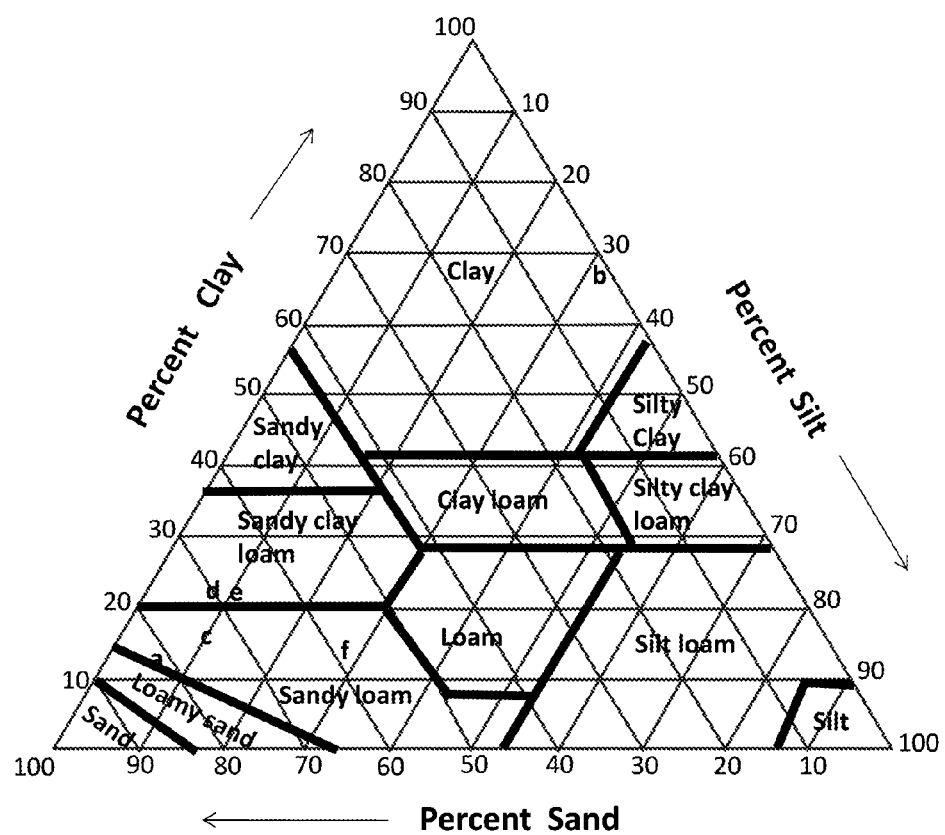
FIG. 1 is a soil classification ternary diagram representing the relative content of clay, silt, and sand in soil.

The present embodiments of the present invention will be best understood by reference to the drawings and the following more detailed description of the embodiments of the invention. They are not intended to limit the scope of the invention, as claimed, but is merely representative of embodiments of the invention.

Mineral Matter in Coal

As used herein, the term coal-derived mineral matter includes the mineral matter inherent in coal. It originates from mechanisms or sources associated with coal-forming plants, sediment that was deposited into the peat swamp via wind or water erosion, water solution containing dissolved and suspended minerals which flowed into peat swamp, groundwater containing dissolved and suspended minerals that flowed into seams of coal after formation, gas that diffused into the coal after formation, and/or products from volcanic activity that were deposited in peat swamps. (Coal, Oil Shale, Natural Bitumen, Heavy Oil and Peat, Gao Jinsheng, Ed., Vol. 1, *Mineral Matter in Coal*, 2009, page 172). Mineral matter in coal can be syngenetic, meaning formed at the same time during the accumulation of the plant debris; early diagenetic, meaning formed shortly after being buried by more peat or other sediment; late diagenetic, meaning formed during the processes associated with the deepened buried depth and advanced coalification; or epigenetic, meaning formed after the coal reached its present rank. (Id., p. 169).

Plants contain many kinds of inorganic matter including primary and secondary minerals. Such can be syngenetic and maybe early diagenic mineral forms. Id., p. 169. Minerals carried in by water and wind include clay minerals, quartz, apatite, zircon, rutile, feldspar, mica, etc. Such can be early diagenetic, late diagenetic and epigenetic mineral forms. Id., p. 169. Aggregates of mineral matter that are relatively large are routinely separated from coal through standard coal preparation processes. The very fine mineral particles found in coal, are very difficult or even impossible to remove through usual large-scale coal preparation processes. The very fine mineral matter in coal is often found embedded in the macerals of the coal. These very fine mineral particles embedded in the macerals are the major source of the mineral matter (ash-forming particles) separated from fine coal particles by froth flotation processes as described in copending U.S. patent application Ser. No. 14/495,657, entitled "FLOTATION SEPARATION OF FINE COAL PARTICLES FROM ASH-FORMING PARTICLES." These fine mineral particles were trapped in the coal as fine particles in the macerals during coal formation. Hence they are largely syngenetic or maybe early diagenetic (see Id., p. 169).

Coal-derived mineral matter is known to provide a source of metallic or non-metallic trace elements such as Ge, Ga, Va, Au, Ag, Be, Cu, La, Zn, etc. Coal ash is often used to manufacture bricks and various construction materials and it can partially replace cement in concrete. Id., p. 176. It is presently unknown to use fine mineral matter recovered from coal as a soil amendment.

The following non-limiting examples are given to illustrate several embodiments relating to the disclosed coal flotation separation process and related apparatus. It is to be understood that these examples are neither comprehensive nor exhaustive of the many types of embodiments which can be practiced in accordance with the presently disclosed invention.

Example 1

FIG. 1 is a soil classification ternary diagram representing the relative content of clay, silt, and sand in soil. Loam is generally considered the ideal soil representing approximately equal amounts of sand and silt size with a lesser amount of clay. Table 1 below shows the texture of a sandy loam soil that, by definition, is missing significant amount of silt and clay particles. Coal-derived mineral matter sample C028 was blended in with the sandy loam soil to change the soil texture at loadings of 10%, 20%, and 30% by weight of coal-derived mineral matter. Additionally, because the coal-derived mineral matter sample C028 has a higher cation exchange capacity (CEC) than the sandy loam soil, CEC of the blends increased in comparison to the sandy loam soil. The cation exchange capacity measures the capacity of a soil to hold or store exchangeable cations such as potassium ($K^+$), calcium ($Ca^{++}$), magnesium ($Mg^{++}$), and ammonium ($NH_4^+$). The observed increase in CEC ranged from 3.7 to 5.6 meq+/100 g depending on the amount of mineral matter added. The observed increase in CEC was at least 4 $meq^+$/100 g dry soil.

FIG. 1 shows graphically where the sandy loam soil, the coal-derived mineral matter sample C028, and the three blends lie on the soil texture triangle. As can be seen, the soil texture of the sandy loam soil was changed to a sandy clay loam then back to a sandy loam (sample f) that is much closer to the ideal loam texture.

TABLE 1

Texture of soil samples starting with a sandy loam soil and then blending in different percentages of coal-derived mineral matter (sample C028).

| | SAND wt. % | SILT wt. % | CLAY wt. % | Texture | Cation Exchange Capacity (meq+/100 g) |
|---|---|---|---|---|---|
| (a) Sandy loam soil | 82 | 6 | 12 | Sandy Loam | 5 |
| (b) C028 | 2 | 30 | 68 | Heavy Clay | 9.2 |
| (c) 10 wt. % C028 | 74 | 10 | 16 | Sandy Loam | 8.7 |
| (d) 15 wt. % C028 | 70 | 8 | 22 | Sandy Clay Loam | 9.3 |
| (e) 20 wt. % C028 | 68 | 10 | 22 | Sandy Clay Loam | 9.7 |
| (f) 30 wt. % C028 | 58 | 14 | 28 | Sandy Loam | 10.6 |

Example 2

Fine Mineral Matter Separated from Fine Coal as a Soil Texture Amendment

Figure 2:
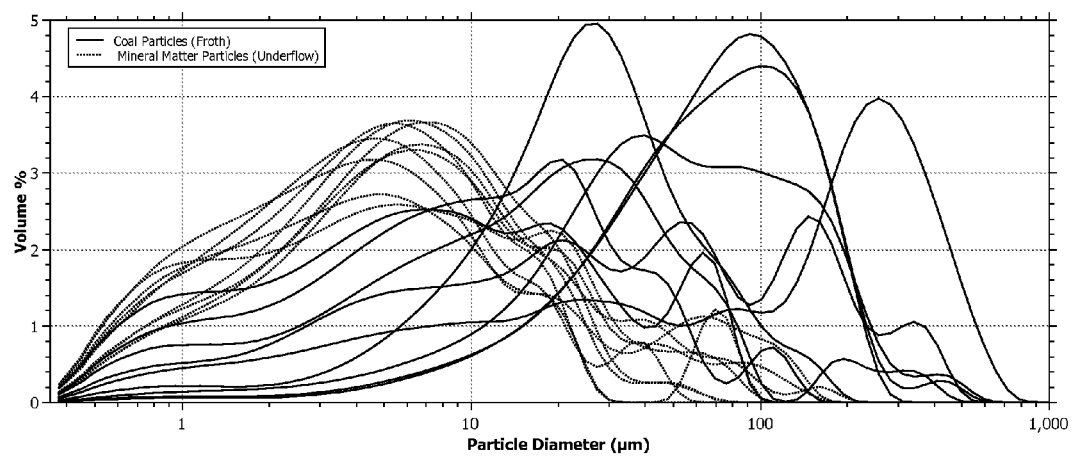
FIG. 2 is a graph of comparing the typical particle size distribution of the floated froth containing discrete particles of coal with about 5% by weight discrete mineral matter particles on a dry basis and tailings or underflow separated from the froth in the flotation separation process comprising fine particles of the coal-derived mineral matter with about 10% to 15% by weight discrete, oxidized coal particles on a dry basis. The mineral matter present in the tailings or underflow comprises less than 30% by weight discrete, oxidized coal particles on a dry basis.

FIG. 2 is a graph comparing the typical particle size distribution of the floated coal-froth containing discrete coal particles and about 5% by weight discrete mineral matter particles on a dry basis with the tailings or underflow separated from the coal-froth in the flotation separation process containing fine particles of the coal-derived mineral matter with about 10% to 15% by weight discrete, oxidized coal particles on a dry basis. The mineral matter present in the tailing or underflow comprises less than 30%. by weight discrete, oxidized coal particles on a dry basis. Even though the main particle size peak for the coal-froth particles changed (ranging between 30 and 250 μm. depending on the source of the coal feedstock that was used in the flotation separation process. the froth particles (coal particles) were always larger than the underflow particles (coal-derived mineral matter particles). As the amount of discrete coal particles increases in a tailings or underflow sample, the small peaks around 50 to 100 μm also grow. In other words, the small peaks in the tailings at about 50 to 100 μm are observed to increase with increasing coal content. In addition, the dominant peaks in the tailings or underflow that are centered at about 6 to 8 μm and end at about 30 μm are the coal-derived mineral matter particles.

Figure 3:
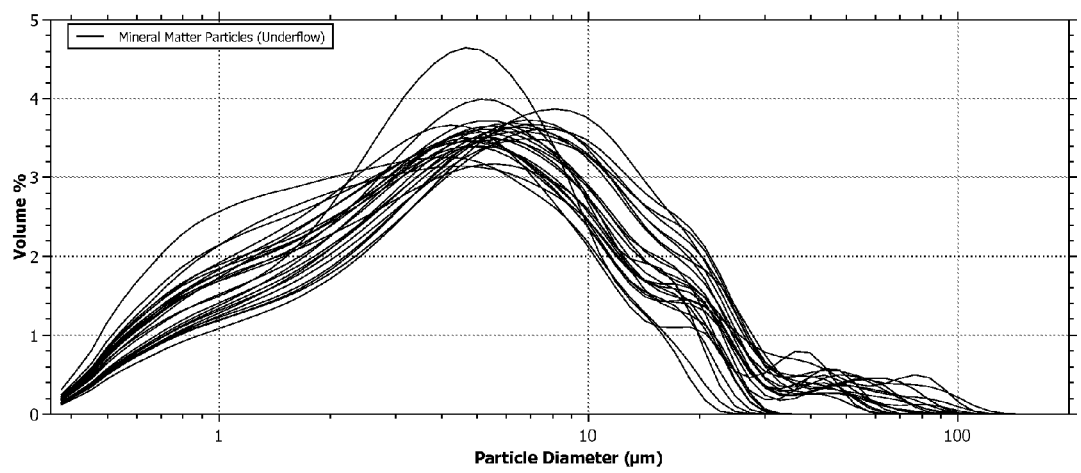
FIG. 3 is a graph of the particle size distribution for twenty-six samples from different coal refuse sites of fine particles of the coal-derived mineral matter separated from fine coal matter by flotation separation and recovered in the tailings or underflow.

FIG. 3 is a graph of the particle size distribution for twenty-six coal-derived fine mineral matter samples obtained by flotation separation of fine coal refuse from twenty-six different refuse sites. FIG. 3 further demonstrates the particle size of the coal-derived mineral matter obtained through flotation separation of coal particles from mineral matter particles. The coal-derived mineral matter is recovered in the tailings or underflow of the flotation cell. Stated otherwise, the coal particles floated out of the flotation cell as coal-froth, and the coal-derived fine mineral matter remained behind in the flotation cell and were recovered when the flotation cell was drained. Table 2 shows the average and median particle sizes for these same coal-derived mineral matter samples. In FIG. 3, all samples showed very similar particle size distribution, with most particles having a size less than 100 μm. Discounting the peaks at about 50 to 100 μm which are associated with coal particles in the tailings as previously discussed, the tailings particle size distributions show main peaks between 6 and 9 μm for all the samples. The peaks end or reach the baseline at about 30 μm, meaning that the mineral matter particles in the tailings are typically smaller than 30 μm. Table 2 shows that the average particle sizes are less than 10 μm and the median particle sizes are less than about 6.5 μm for all 26 samples.

TABLE 2

Mean and median particle size of coal-derived mineral matter separated from coal matter by flotation separation.

| | Particle Size (μm) | |
|---|---|---|
| Sample # | Mean | Median |
| C028 | 6.2 | 4.5 |
| C035 | 7.9 | 4.4 |
| C055 | 5.7 | 4.3 |
| C056 | 5.8 | 3.7 |
| C057 | 5.3 | 3.7 |
| C060 | 9.3 | 6.0 |
| C074 | 7.2 | 4.3 |
| C080 | 5.9 | 4.1 |
| C082 | 9.8 | 4.8 |
| C093 | 5.0 | 4.1 |
| C126 | 8.6 | 6.0 |
| C128 | 9.3 | 6.3 |
| C131 | 3.0 | 1.5 |
| C146 | 8.4 | 6.6 |
| C148 | 5.8 | 4.2 |
| C156 | 7.5 | 4.2 |
| C157 | 7.7 | 4.3 |
| C158 | 8.6 | 4.9 |
| C172 | 10.0 | 5.3 |
| C178 | 8.0 | 5.4 |
| C185 | 6.6 | 3.8 |
| C186 | 8.2 | 5.1 |
| C187 | 8.8 | 5.9 |
| C188 | 7.7 | 5.4 |
| C189 | 8.3 | 5.6 |
| C200 | 9.1 | 6.5 |

Fine mineral matter was separated from fine coal through froth flotation processes. The fine mineral matter was always smaller than the fine coal (See FIG. 2). FIG. 3 shows the particle size of fine mineral matter separated from fine coal matter for twenty-six coal refuse samples from different refuse impoundments. As can be seen from the particle size data in FIG. 2 and FIG. 3, the fine mineral matter separated from the fine coal particles spans the upper end of the clay particle size range and the lower end of the silt particle size range when considering particle size classifications for soil texture. The fine mineral matter separated from the fine coal particles can be used as a soil amendment to introduce fine particles to a soil depleted of fine particles (e.g. clay and silt particle size classifications) in order to improve, augment, and/or change the soil texture.

Example 3

Nutrients in the Mineral Matter Particles

Elements must be present and available in soils for healthy plants to grow in the soil. If a nutrient is not present in the soil, it cannot be included in the plant. The fertilizer industry is based on establishing nutrient levels for high yield plant growth.

Sixteen nutrients are essential for plant growth. They are carbon, hydrogen, oxygen, nitrogen, phosphorus, potassium, sulfur, calcium, magnesium, iron, boron, manganese, copper, zinc, molybdenum, and chlorine. With the exception of carbon, hydrogen and oxygen, which are supplied by carbon dioxide and water, the nutrients must be dissolved in the soil solution of the topsoil to become accessible to the plant roots, particularly the root hairs where mineral adsorption primarily occurs. The topsoil acts as a reservoir of sorts from which essential plant nutrients are accessed. The concentration of some or all of these nutrients in soil is referred to herein as the nutrient concentration profile.

The prevailing view is that nutrients must be present as ions in solution in the water present in the soil in order for plants to be able to absorb the nutrients. Without being bound by theory, it is believed a mechanism by which the nutrients become present as ions and available to the plants is via acidic leaching of the nutrients from solid mineral matter particles. Microbes in the soil produce organic acids that interact with soil particles and leach ions into solution to make them bioavailable to plants. Fine particles in soils have the highest surface area, making them the most active particles for providing nutrients to the soil via acidic leaching. As a result, fine particles in soils are a major source of naturally occurring nutrients available to plants in soils.

Fine Mineral Matter Particles Separated from Coal Particles as a Nutrient Amendment to Soil Fine mineral matter particles separated from coal particles were characterized and shown to contain many of the major nutrients needed for healthy soils. As an example. Table 3 shows the amount of the above mentioned nutrients that are important for healthy plant growth in a coal-derived fine mineral matter particle samples as determined via elemental analysis. The elemental analysis was carried out by first dissolving the soil in acids and then using calibrated inductive coupled plasma atomic emission spectroscopy (ICP-AES) to quantify the amount of target elements within the dissolved soil sample. The elemental analysis shows the total amount of each elemental nutrient that is found within the coal-derived fine mineral matter. The coal-derived fine mineral matter can be used as a soil amendment to introduce essential element nutrients into the soil. Table 4 shows additional elements that were characterized in the elemental analysis.

TABLE 3

Total elemental analysis of coal-derived fine mineral matter samples where the elements listed are considered essential nutrients needed for plant growth.

| | C028 (ppm) | C080 (ppm) | C082 (ppm) | C093 (ppm) | C128 (ppm) | C241 (ppm) | C278 (ppm) | C309 (ppm) |
|---|---|---|---|---|---|---|---|---|
| Boron | 5.3 | 14.8 | 10.5 | 7.4 | 6.1 | 7.4 | 7.3 | 31.2 |
| Calcium | 17,600 | 1,570 | 2,840 | 17,800 | 2,590 | 1,170 | 2,720 | 6,540 |
| Chloride | 23.2 | 17.0 | 12.8 | 16.6 | 34.0 | 35.4 | 120.0 | 11.6 |
| Copper | 42.8 | 14.2 | 28.2 | 43.0 | 44.2 | 48.2 | 44.6 | 38.9 |
| Iron | 30,100 | 21,400 | 65,000 | 21,500 | 39,800 | 14,100 | 20,500 | 23,100 |
| Magnesium | 5,190 | 619 | 2,420 | 5,240 | 7,630 | 3,170 | 3,110 | 1,840 |
| Manganese | 253 | 25 | 303 | 224 | 653 | 142 | 166 | 282 |
| Molybdenum | 1.9 | 1.5 | 2.3 | 1.4 | ND | 1.3 | 1.2 | 1.7 |
| Nitrogen | 1,190 | 4,450 | 3,060 | 2,020 | 806 | 3,270 | 1,930 | 2,830 |
| Phosphorus | 139.00 | 343 | 525 | 188 | 362 | 85 | 93 | 699 |
| Potassium | 2,980 | 1,770 | 2,140 | 2,980 | 3,370 | 2,520 | 2,490 | 691 |
| Sulfur | 1,920 | 5,640 | 2,740 | 4,620 | 1,480 | 3,400 | 1,070 | 10,100 |
| Zinc | 92.8 | 20.5 | 90.0 | 65.8 | 100.0 | 62.7 | 61.9 | 73.7 |

ND = not detectable

TABLE 4

Additional elements measured for different coal derived-mineral fine matter samples that are not shown in Table 3.

| | C028 (ppm) | C080 (ppm) | C082 (ppm) | C093 (ppm) | C128 (ppm) | C241 (ppm) | C278 (ppm) | C309 (ppm) |
|---|---|---|---|---|---|---|---|---|
| Aluminum | 15,700 | 7,620 | 12,100 | 12,300 | 21,000 | 11,200 | 10,300 | 8,790 |
| Barium | 962 | 118 | 199 | 4,240 | 261 | 148 | 151 | 151 |
| Beryllium | 1.67 | 0.62 | 0.91 | 1.85 | 1.35 | 1.49 | 1.17 | 0.60 |
| Fluoride | 5.60 | ND | 6.20 | 6.40 | 3.40 | 4.40 | 5.60 | 1.00 |
| Silicon | 456 | 599 | 541 | 560 | 470 | 827 | 716 | 657 |
| Silver | ND | ND | ND | ND | ND | ND | ND | ND |
| Sodium | 386.00 | 443.00 | 261.00 | 322.00 | 305.00 | 310.00 | 477.00 | 1,740.00 |
| Tin | ND | ND | ND | ND | ND | ND | ND | ND |

ND = not detectable

Example 4

Nutrients need to be in solution in the water in the soil as ions, e.g. bioavailable, in order to be consumed by the plant through the root system. The bioavailable nutrients of a soil sample are tested by soaking a soil sample in water, allowing the water to reach an equilibrium state, and then measuring the target nutrients that are present as ions and other parameters such as salinity, cation exchange capacity, and pH. This test is often called a soil analysis test. Tables 5 and 6 show soil analysis test results for the 8 different coal derived mineral matter samples reported herein.

TABLE 5

Bioavailable elemental analysis of coal-derived fine mineral matter samples where the elements listed are considered essential nutrients needed for plant growth.

| | C028 (ppm) | C080 (ppm) | C082 (ppm) | C093 (ppm) | C128 (ppm) | C241 (ppm) | C278 (ppm) | C309 (ppm) |
|---|---|---|---|---|---|---|---|---|
| Boron | 1 | 0 | 1 | 1 | 0 | 1 | 1 | 4 |
| Calcium | 1,981 | 691 | 948 | 2,364 | 519 | 521 | 726 | 2,178 |
| Copper | 1 | 1 | 2 | 2 | 1 | 1 | 2 | 2 |
| Iron | 24 | 76 | 53 | 44 | 15 | 12 | 14 | 40 |
| Magnesium | 194 | 67 | 83 | 92 | 109 | 118 | 193 | 472 |
| Manganese | 2 | 1 | 15 | 5 | 4 | 3 | 3 | 21 |
| Nitrogen as $NO_3$—N | 1 | 1 | 1 | 1 | 1 | 1 | 1 | 1 |
| Phosphorus as $NaHCO_3$—P | 17 | 19 | 8 | 9 | 11 | 4 | 5 | 5 |
| Phosphorus from Weak Bray | 47 | 21 | 6 | 23 | 4 | 34 | 27 | 17 |
| Potassium | 73 | 62 | 85 | 88 | 69 | 109 | 70 | 153 |
| Sodium | 67 | 31 | 38 | 51 | 39 | 110 | 140 | 914 |
| Sulfur as $SO_4$ | 112 | 194 | 277 | 182 | 90 | 67 | 127 | 130 |
| Zinc | 1 | 1 | 1 | 1 | 0 | 0 | 1 | 2 |

TABLE 6

Salinity, cation exchange capacity, and pH in soil analysis tests results for different coal derived mineral matter samples.

|  | C028 | C080 | C082 | C093 | C128 | C241 | C278 | C309 |
|---|---|---|---|---|---|---|---|---|
| Salinity via electrical conductivity (dS/m) | 1.2 | 1.5 | 2.3 | 0.9 | 0.9 | 0.9 | 1.2 | 1.4 |
| Cation Exchange Capacity (meq+/100 g) | 12.0 | 17.2 | 6.2 | 13.0 | 3.8 | 4.3 | 6.0 | 20.7 |
| pH | 7.7 | 3.8 | 6.6 | 7.9 | 7.6 | 8.0 | 7.5 | 6.5 |

Example 5

The total elemental analysis reported in Table 3 quantifies the total amount of a target element found in a coal-derived fine mineral matter sample. The bioavailable nutrients available for immediate uptake by plants results are shown in Table 5. Table 7 quantifies the percentage of a given element that is bioavailable, e.g. target bioavailable element divided by target total element. Since the bioavailable level is well below 100% and as will be discussed later, about 70 wt. % of the coal derived fine mineral matter is secondary minerals, it is likely that most of the elemental nutrients can become bioavailable over the course of time and chemical leaching of the secondary elements

TABLE 7

Elemental bioavailability percentage for coal-derived fine mineral matter samples.

|  | C028 | C080 | C082 | C093 | C128 | C241 | C278 | C309 |
|---|---|---|---|---|---|---|---|---|
| Boron | 9.4% | 2.7% | 5.7% | 13.5% | 6.6% | 10.8% | 8.2% | 13.8% |
| Calcium | 11.3% | 44.0% | 33.4% | 13.3% | 20.0% | 44.5% | 26.7% | 33.3% |
| Copper | 3.3% | 4.2% | 6.4% | 4.0% | 2.0% | 2.3% | 3.8% | 4.1% |
| Iron | 0.08% | 0.36% | 0.08% | 0.20% | 0.04% | 0.09% | 0.07% | 0.17% |
| Magnesium | 3.7% | 10.8% | 3.4% | 1.8% | 1.4% | 3.7% | 6.2% | 25.7% |
| Manganese | 0.8% | 3.9% | 5.0% | 2.2% | 0.6% | 2.1% | 1.8% | 7.4% |
| Nitrogen | 0.08% | 0.02% | 0.03% | 0.05% | 0.12% | 0.03% | 0.05% | 0.04% |
| Phosphorus | 46.0% | 11.7% | 2.7% | 17.0% | 4.1% | 44.5% | 34.4% | 3.1% |
| Potassium | 2.4% | 3.5% | 4.0% | 3.0% | 2.0% | 4.3% | 2.8% | 22.1% |
| Sulfur | 5.8% | 3.4% | 10.1% | 3.9% | 6.1% | 2.0% | 11.9% | 1.3% |
| Zinc | 1.5% | 2.9% | 0.9% | 0.8% | 0.4% | 0.6% | 0.8% | 2.2% |

Example 6

Heavy Metal Content of the Coal-Derived Fine Mineral Matter

The Environmental Protection Agency specifically monitors arsenic, cadmium, chromium, cobalt, copper, lead, mercury, molybdenum, nickel, selenium, vanadium, and zinc when they are added to farmland in biosolids fertilizers and sludges. Table 8 shows elemental analysis results using ICP-AES to quantify the above mentioned heavy metal content in the eight different coal-derived fine mineral matter samples noted above. The final column shows that all the heavy metals listed fall below the EPA 503 upper limits for biosolids that are added to agricultural fields

TABLE 8

Heavy metal levels found in the coal derived fine mineral matter samples.

|  | C028 | C080 | C082 | C093 | C128 | C241 | C278 | C309 | EPA 503 Upper Limits for Biosolids |
|---|---|---|---|---|---|---|---|---|---|
| Arsenic | 17.8 | 15.7 | 20.4 | 16.6 | 6.7 | 11.1 | 18.9 | 4.5 | 41 |
| Cadmium | 0.6 | 0.4 | 1.0 | 0.5 | 0.7 | 0.3 | 0.4 | 0.5 | 39 |
| Chromium | 18.1 | 18.3 | 43.3 | 53.8 | 51.6 | 32.5 | 20.0 | 26.1 | 1200 |
| Cobalt | 14.6 | 4.1 | 13.4 | 10.0 | 15.1 | 10.7 | 8.9 | 8.8 | 20 |
| Copper | 42.8 | 14.2 | 28.2 | 43.0 | 44.2 | 48.2 | 44.6 | 38.9 | 1500 |
| Lead | 26.7 | 25.9 | 22.6 | 19.0 | 19.9 | 25.2 | 26.1 | 7.0 | 300 |
| Mercury | 0.1 | 0.1 | 0.2 | 0.1 | 0.0 | 0.1 | 0.1 | 0.1 | 17 |
| Molybdenum | 1.9 | 1.5 | 2.3 | 1.4 | ND | 1.3 | 1.2 | 1.7 | 18 |
| Nickel | 31.0 | 10.9 | 31.3 | 41.2 | 36.2 | 29.4 | 19.3 | 20.5 | 420 |
| Selenium | ND | ND | ND | ND | ND | 5.4 | 3.3 | ND | 36 |
| Vanadium | 13.4 | 45.2 | 99.0 | 54.6 | 23.9 | 21.0 | 21.0 | 30.8 | 100 |
| Zinc | 92.8 | 20.5 | 90.0 | 65.8 | 100.0 | 62.7 | 61.9 | 73.7 | 2800 |

ND = not detectable

Example 7

Mineralogy of the Coal-Derived Fine Mineral Matter

Minerals are found in soils in two general classes: primary minerals and secondary minerals. Primary minerals are very similar chemically to the parent rock from which the soil particles were derived having only undergone physical weathering, e.g. erosion. Secondary minerals are created when primary minerals are changed over time via chemical weathering, e.g. precipitation or recrystallization. Sand and larger silt particles are usually primary minerals. Smaller silt particles and clay particles are usually secondary minerals. Secondary minerals more easily release ions, or nutrients, into the soil for plants to use as they grow. The mineralogy of the bulk samples and clay-size (e.g. <2 μm) fraction samples from the eight different coal-derived mineral matter samples were characterized using X-ray diffraction (XRD) and X-ray fluorescence (XRF) data. Table 9 shows the mineralogy of the bulk samples, and Table 10 shows the mineralogy of the clay-size fraction samples. Quartz and feldspar are the primary minerals. The rest of the minerals in Tables 9 and 10 are secondary minerals. As stated earlier in the discussion surrounding FIG. 3, the particle size of the coal derived mineral matter contains smaller silt particles and clay particles. Since silt particles are present, primary minerals are expected to be present as well. In Table 9 about 25 wt. % to 30 wt. % of the bulk samples consisted of primary minerals (quartz and feldspar). Yet in Table 10, less than 5 wt. % of the clay-sized fraction samples are primary mineral (quartz and feldspar). As expected, the finer sized particles are all secondary minerals. Further, another way to look at the mineralogy of the bulk samples is they are all about 70 wt. % or more secondary minerals (e.g. clays). The fine secondary minerals have larger surface area than larger primary mineral which help induce a larger water holding capacity in soils. Secondary minerals often have surface charges which help retain ions in the soil, for example by increasing the cation exchange capacity of the soil.

TABLE 9

Mineralogy of eight coal derived mineral matter samples as determined using X-ray diffraction (XRD) and X-ray fluorescence (XRF) data of bulk samples.

| Mineral Name | Approximate wt. % | | | | | | | |
|---|---|---|---|---|---|---|---|---|
| | C028 | C080 | C082 | C093 | C128 | C241 | C278 | C309 |
| Mica/illite | 35 | 20 | 25 | 36 | 40 | 41 | 39 | <5 |
| Kaolinite | 24 | 30 | 24 | 14 | 13 | 18 | 18 | 5 |
| Chlorite | 9 | — | 7 | 11 | 12 | 9 | 8 | <5 |
| Smectite | — | — | — | — | — | — | — | 30 |
| Quartz | 20 | 20 | 25 | 25 | 27 | 23 | 27 | 16 |
| K-feldspar | <5 | <5 | <5 | <5 | <5 | <5 | <5 | — |
| Plagioclase feldspar | — | — | — | — | — | — | — | 20 |
| Clinoptilolite | — | — | — | — | — | — | — | <3 |
| Calcite | 5 | — | — | 5 | — | — | — | — |
| Jarosite | — | 7 | — | — | — | — | — | — |
| Magnetite | — | — | 10 | — | — | — | — | — |
| Pyrite | — | — | <1 | <1 | <1 | — | <1 | <2 |
| "Amorphous" | — | <20 | — | — | — | — | — | <20 |
| "Unidentified" | <5 | <5 | <5 | <5 | <5 | <5 | <5 | <5 |

TABLE 10

Mineralogy of eight coal derived mineral matter samples as determined using X-ray diffraction (XRD) and X-ray fluorescence (XRF) data of the clay-size fraction (e.g. <2 μm) of the samples.

| Mineral Name | Approximate wt. % | | | | | | | |
|---|---|---|---|---|---|---|---|---|
| | C028 | C080 | C082 | C093 | C128 | C241 | C278 | C309 |
| Mica/illite | 50 | — | — | 44 | 50 | 54 | 48 | <5 |
| Mixed layer clay* | — | 43 | 37 | — | — | — | — | — |
| Kaolinite | 46 | 47 | 52 | 46 | 39 | 40 | 45 | 6 |
| Chlorite | <5 | — | 5 | <5 | 6 | <5 | <5 | — |
| Smectite | — | — | — | — | — | — | — | 90 |
| Quartz | — | <5 | <5 | <5 | <5 | <5 | <5 | — |
| Jarosite | — | 5 | — | — | — | — | — | — |
| Calcite | — | — | — | <3 | — | — | — | — |
| "Unidentified" | <5 | <5 | <5 | <5 | <5 | <5 | <5 | <5 |

*A phase consisting of a mica component and a smectite component.

TABLE 11

The chemical formula for the mineral names identified in Tables 9 and 10.

| Mineral Name | Chemical Formula |
|---|---|
| Mica/illite | $(K, Na, Ca)(Al, MgFe)_2(Si, Al)_4O_{10}(OH, F)_2$ |
| Kaolinite | $Al_2Si_2O_5(OH)_4$ |
| Chlorite | $(Mg, Fe, Al)_6(Si, Al)_4O_{10}(OH)$ |
| Smectite | $(Ca, Na)_x(Al, Mg, Fe)_4(Si, Al)_8O_{20}(OH, F)_4 \cdot nH_2O$ |
| Quartz | $SiO_2$ |
| K-feldspar | $KAlSi_3O_8$ |
| Plagioclase feldspar | $(Na, Ca)Al(Si, Al)_3O8$ |
| Clinoptilolite | $(Na, K, Ca)6(Si, Al)_{36}O_{72} \cdot 20H_2O$ |
| Calcite | $CaCO_3$ |
| Jarosite | $(K, Na, H_3O)Fe_3(SO_4)_2(OH)_6$ |
| Magnetite | $(Fe, Mg, Zn, Cu, Ni)(Fe, Al, Cr)_2O_4$ |
| Pyrite | $FeS_2$ |
| "Amorphous" | ? |
| "Unidentified" | ? |

Example 8

Figure 4:
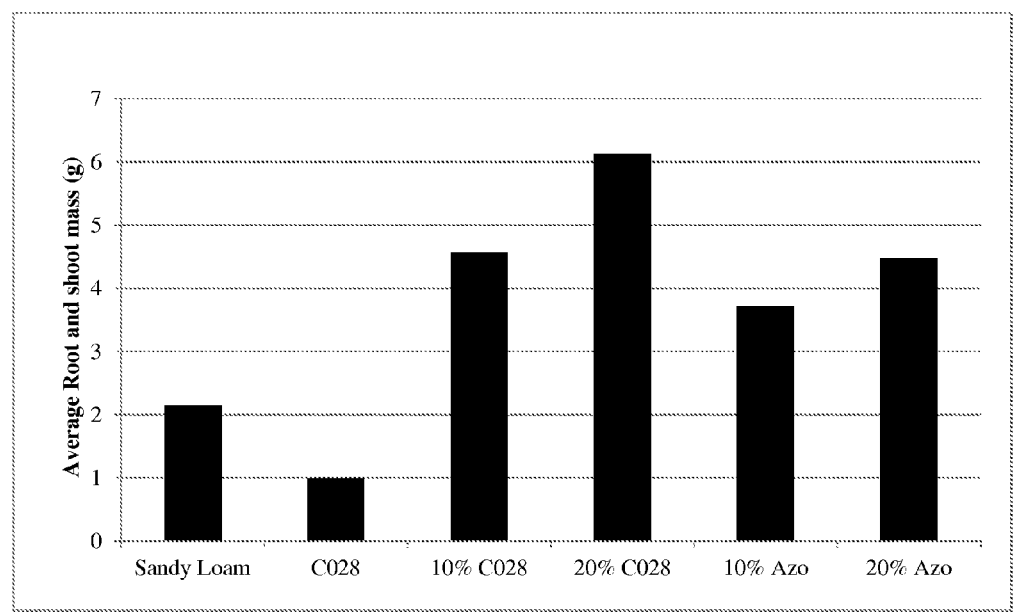
FIG. 4 is a graph comparing the average root and shoot mass (grams) of spinach plants grown in different soils.

Green House Growth Studies Using Coal-Derived Mineral Matter as a Soil Amendment Green house growth studies were done growing spinach plants in sandy loam soil, coal-derived mineral matter C028 sample, blends of sandy loam with 10% and 20% by weight the coal-derived mineral matter C028 sample, and blends of the sandy loam soil with 10% and 20% by weight azomite. Azomite is a commercially available soil amendment. Water and light were the same for all plants. No fertilizers were used to enhance plant growth. The results from the green house growth study shown in FIG. 4 indicate that the use of the coal-derived mineral matter improves plant growth by about a factor of 3 in comparison to the original sandy loam soil. Furthermore, spinach plants grew better when the coal derived mineral matter was used as a soil amendment than when a commercially available soil amendment was used as a soil amendment. It is presumed that the improved soil texture and available nutrients that are present when the coal-derived mineral matter is blended with the sandy loam are reasons for the increased plant growth.

It is a significant advancement in the art to provide a beneficial use for the fine mineral matter separated from coal as otherwise it becomes a waste product either as refuse filling up ravines, streams and mountain hollows or as fly ash after coal is burned in a power plant. It is a further advancement in the art to provide a method for improving soil texture and nutrient characteristics because the mineral content in agricultural soil has diminished. Improving the nutrient concentration profile in soil is desirable to produce crops having higher nutrient content for good human and animal nutrition.

Fine mineral matter when added to soil increases the silt and clay fractions of the soil changing the topsoil texture, increasing mineral availability, and increasing water holding capacity and cation-exchange capacity (CEC).

The invention claimed is:

1. A method of modifying soil texture and/or improving nutrient concentration profile comprising:
    obtaining a quantity of discrete coal-derived mineral matter particles separated from discrete non-combusted coal particles, wherein the mineral matter particles are non-combustible and the coal particles are combustible, and prior to being separated from the non-combusted coal particles the mineral matter particles were among the mineral matter particles inherent in coal; and
    mixing the mineral matter particles with soil.

2. A method of improving soil according to claim 1, wherein the mineral matter particles have a size less than 50 μm.

3. A method of improving soil according to claim 1, wherein the mineral matter particles have a size less than 30 μm.

4. A method of improving soil according to claim 1, wherein the mineral matter particles have an average size of 10 μm or less.

5. A method of improving soil according to claim 1, wherein the mineral matter particles mixed with the soil are present in the mixture in an amount ranging from 5 to 30 wt. %.

6. A method of improving soil according to claim 1, wherein the mineral matter particles mixed with the soil are present in the mixture in an amount ranging from 10 to 20 wt. %.

7. Amended soil having modified soil texture and/or improved nutrient concentration profile comprising a quantity of discrete coal-derived mineral matter particles separated from discrete non-combusted coal particles mixed with soil, wherein the mineral matter particles are non-combustible and the coal particles are combustible, and prior to being separated from the non-combusted coal particles the mineral matter particles were among the mineral matter particles inherent in coal.

8. Amended soil according to claim 7, wherein the mineral matter particles contain a plurality of essential nutrients necessary for healthy plant growth selected from the group consisting of B, Ca, Cl, Cu, Fe, Mg, Mn, Mo, N, P, K, S, and Zn.

9. Amended soil according to claim 7, wherein the mineral matter particles have a size less than 50 μm.

10. Amended soil according to claim 7, wherein the mineral matter particles have a site less than 30 μm.

11. Amended soil according to claim 7, wherein the mineral matter particles have an average size less than 10 μm.

12. Amended soil according to claim 7, wherein the mineral matter comprises less than 30% by weight discrete, oxidized coal particles on a dry basis.

13. Amended soil according to claim 7, wherein the mineral matter particles are present in the soil mixture in an amount from 5 to 30 wt. %.

14. A method of improving soil cation exchange capacity (CEC) comprising:
    obtaining a quantity of discrete coal-derived mineral matter particles separated from discrete non-combusted coal particles, wherein the mineral matter particles are non-combustible and the coal particles are combustible, and prior to being separated from the non-combusted coal particles the mineral matter particles were among the mineral matter particles inherent in coal; and
    mixing the mineral matter particles with soil, wherein the resulting soil has a CEC improvement of at least 4 meq$^+$/100 g dry soil.

* * * * *